United States Patent [19]

Hong

[11] 4,238,206

[45] Dec. 9, 1980

[54] USING SOLVENTS FOR ACIDIC GAS REMOVAL

[75] Inventor: Charles C. Hong, Columbus, Ohio

[73] Assignee: Columbia Gas System Service Corporation, Wilmington, Del.

[21] Appl. No.: 17,468

[22] Filed: Mar. 5, 1979

[51] Int. Cl.$^3$ .............................................. B01D 19/00
[52] U.S. Cl. .......................................... 55/48; 55/68
[58] Field of Search ........................... 55/68, 73, 48

[56] References Cited

U.S. PATENT DOCUMENTS

| | | | |
|---|---|---|---|
| 1,971,798 | 8/1934 | Schoeld | 423/223 |
| 2,161,663 | 6/1939 | Baehr et al. | 423/228 |
| 2,177,068 | 10/1939 | Hutchinson | 423/437 |
| 2,437,288 | 3/1948 | Anderson | 423/229 |
| 2,712,978 | 7/1955 | Blohm et al. | 423/228 |
| 2,926,751 | 3/1960 | Kohl et al. | 55/68 |
| 3,516,793 | 6/1970 | Renault | 423/573 R |
| 3,824,766 | 7/1974 | Valentine et al. | 55/68 |
| 3,829,494 | 8/1974 | Yeakey et al. | 260/584 C |
| 3,891,742 | 6/1975 | Yeakey et al. | 423/229 |
| 4,100,257 | 7/1978 | Sartori et al. | 423/226 |
| 4,101,633 | 7/1978 | Sartori et al. | 423/228 |
| 4,145,192 | 3/1979 | Beise et al. | 55/73 |

FOREIGN PATENT DOCUMENTS

| | | | |
|---|---|---|---|
| 2709501 | 9/1977 | Fed. Rep. of Germany | 55/68 |
| 2805640 | 8/1978 | Fed. Rep. of Germany | 55/68 |

*Primary Examiner*—Bernard Nozick
*Attorney, Agent, or Firm*—Sidney W. Millard

[57] ABSTRACT

Disclosed is an improved process for removing carbon dioxide containing acidic gas from a normally gaseous mixture wherein the gaseous mixture is contacted with a liquid anhydrous solvent which physically absorbs said acidic gas but which is chemically unreactive with said acidic gas, said solvent being the reaction product of an alkylating agent and a solvent which is chemically reactive with said acidic gas for its removal from said mixture. The preferred solvent is selected from the group consisting of N,N-dialkylaminoalkanol, N,N-dialkoxyalkylaminoalkanol, N-alkyl-N-alkoxyalkylaminoalkanol, N,N-dialkylaminoalkylether, N,N-dialkoxyalkylaminoalkylether, N-alkyl-N-alkoxyalkylaminoalkylether, dialkyl carbonate, di(alkoxyalkyl) carbonate, mono-alkyl-monoalkoxyalkyl carbonate, and mixtures thereof.

10 Claims, No Drawings

USING SOLVENTS FOR ACIDIC GAS REMOVAL

DESCRIPTION

Background of the Invention

The present invention relates to the removal of carbon dioxide containing acidic gases from gaseous mixtures containing same and more particularly to an improved process for such acidic gas removal and an improved solvent for such process.

It is well known to contact carbon dioxide containing acidic gas mixtures (such as mixtures containing acidic gases including $CO_2$, $H_2S$, $SO_2$, $SO_3$, $CS_2$, HCN, COS, and oxygen and sulfur derivative of $C_1$–$C_4$ hydrocarbons) with a liquid solvent to remove these acidic gases. Two general classes of solvents are used in such scrubbing processes: "physical" solvents which physically absorb the acidic gas, and "chemical" solvents which chemically react with the acidic gas for removal of same. Chemical solvents invariably are provided in aqueous form and effectively operate on gaseous mixtures containing low concentrations of acidic gas, while physical solvents invariably are provided in anhydrous form and operate very effectively on gaseous mixtures containing a high concentration of acidic gas. Physical solvents are known to provide low solvent circulation rates and low regeneration energies for their recovery, but have very low selectivities for preferentially absorbing the acidic gas over the remainder of the gaseous mixture.

Prior art processes for removing acid gas from gaseous mixtures include that of Sartori et al (U.S. Pat. No. 4,100,257) wherein the solvent is a mixture of sterically hindered amine and a t-aminoalcohol dispersed in an organic solvent, optionally admixed with water; and that of Sartori et al (U.S. Pat. No. 4,101,633) wherein the solvent is an amine mixture of sterically hindered amine and a t-aminoalcohol dispersed in water. Yet another prior art proposal is that of Renault (U.S. Pat. No. 3,516,793) wherein elemental sulfur is recovered from a gaseous mixture by contacting the gaseous mixture with an alkanolamine or morpholine dispersed in a solvent of a monoalkylether of a polyhydric alcohol, optionally containing water, followed by contacting the resulting solution with molecular oxygen to form the elemental sulfur. Note, that Example 1 of Renault shows no carbon dioxide absorption with such solvent mixture. Other proposals show various other solvents usually in aqueous form and more often being chemically reactive with the acidic gas for removal of same from the feed gaseous mixture. Even combinations of physical and chemical solvents have been proposed, but usually such solvent mixtures contain water.

Advantages of the present invention include the effective treatement of high acidic gas containing gaseous mixtures, low solvent circulation rates, and low regeneration energies, while achieving relatively high selectivity of the solvent for acid gas absorption. These and other advantages will become readily apparent from the description of the invention herein contained.

BROAD STATEMENT OF THE INVENTION

The present invention is an improvement in a cyclic process for removing carbon dioxide containing acidic gas from a normally gaseous mixture containing same, wherein said gaseous mixture is contacted with a solvent under acidic gas/solvent contact conditions, said acidic gas bearing solvent is stripped of said acidic gas, and said stripped solvent is recycled for contact with additional gaseous mixture. The improvement comprises contacting said gaseous mixture containing on a dry molar basis between about 5% and 95% carbon dioxide with a solvent which is liquid under said contact conditions. The solvent is restricted to an anhydrous solvent which physically absorbs said acidic gas but which is chemically unreactive with said acidic gas under said contact conditions. The solvent is the reaction product of an alkylating agent and a chemical solvent, said reaction product being said physical solvent. Preferably, the solvent is selected from the group consisting of N,N-dialkylaminoalkanols and certain ether derivatives thereof, N,N-dialkylaminoalkylethers and certain ether derivatives thereof, and dialkylcarbonates and certain ether derivatives thereof.

DETAILED DESCRIPTION OF THE INVENTION

The normally gaseous mixture to be treated in accordance with the process of the present invention can be natural gas, coal gas, biomass-derived gas, refinery gas, or any other normally gaseous mixture containing acidic gases.

The solvents of the present invention are physical solvents which means that such solvents will physically absorb the acidic gas but such solvents are chemically unreactive with the acidic gas under gaseous mixture/solvent contact conditions. The solvent is anhydrous because water generally decreases the solvent's capacity for absorbing carbon dioxide even though improved selectivities generally result by including water as a cosolvent. The solvent of the present invention retains advantages common to most physical solvents, including the ability to effectively scrub high acid gas containing gaseous mixtures (e.g. 15–95% by volume acidic gas and usually 15–60%), providing a low solvent circulation rate (high ratio of gaseous mixture per unit of solvent), and low energy for regenerating the solvent (stripping absorbed acidic gas from the solvent for reuse of the solvent). Further, the novel physical solvents of the present invention have a high selectivity for acidic gas absorption which heretofore was an advantage which chemical solvents possessed. The selectivity of the instant solvents can approach the high selectivities of the chemical solvents from which they are derived.

Selectivity for present purposes means the preference of the solvent to absorb acidic gas (measured and referred to in terms of carbon dioxide for purposes of this application) and not absorb the desired fuel gas (for example, methane, ethane, and the like) in admixture with the acidic gas. Selectivity can be determined experimentally by contacting, for example, a methane/carbon dioxide gas mixture with the solvent at a given temperature and pressure, and measuring the resulting molar or volume concentration of carbon dioxide and methane both in the solvent and in the product gas phase. Selectivity then is calculated as follows:

$$\text{SELECTIVITY} = \frac{\left(\dfrac{S_{CO_2}}{S_{CH_4}}\right)}{\left(\dfrac{G_{CO_2}}{G_{CH_4}}\right)}$$

where

SCO$_2$ is the moles of CO$_2$ in the solvent,
SCH$_4$ is the moles of CH$_4$ in the solvent,
GCO$_2$ is the moles of CO$_2$ in the product gas, and
GCH$_4$ is the moles of CH$_4$ in the product gas.

The preferred solvents are N,N-dialkylaminoalkanols, N,N-dialkylaminoalkylethers, and dialkylcarbonates. The alkyl substituents of the preferred solvents can contain ether linkages and the resulting ether derivatives are preferred solvents for the present invention also. The preferred solvents can be represented conventionally by the following general structures:

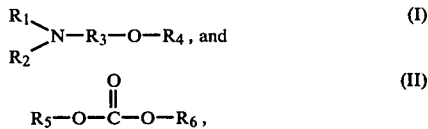

where
each R$_1$, R$_2$, R$_5$ and R$_6$, independently, is a C$_1$-C$_8$ alkyl group or alkoxyalkyl group,
R$_3$ is a C$_1$-C$_6$ divalent alkyl group, and
R$_4$ is hydrogen or a C$_1$-C$_8$ alkyl group.

The preferred solvents can be selected from the group consisting of 2-dimethylaminoethanol, 2-diethylaminoethanol, 2-diisopropylaminoethanol, 2-dibutylaminoethanol, 1-dimethylamino-2-propanol, 3-dimethylamino-1-propanol, 2-(N-methyl-N-ethylamino)ethanol, methyl 2-(dimethylamino)ethyl ether, ethyl 2-(diethylamino)ethyl ether, methyl 2-(diisopropylamino)ethyl ether, ethyl 2-(dibutylamino)ethyl ether, methyl (1-methyl-2-dimethylamino)ethyl ether, ethyl 3-dimethylamino-1-propyl ether, methyl 2-(N-methyl-N-ethylamino)ethyl ether, dimethyl carbonate, diethyl carbonate, dipropyl carbonate, bis-(2-ethoxyethyl)carbonate, bis-(methoxyethyl) carbonate, bis-(3-methylbutyl)carbonate, monoethylmono-2-butoxyethyl carbonate, and mixtures thereof.

The preferred solvents can be derived from corresponding chemical solvents and the preferred physical solvents retain high selectivities (for fuel gas/acidic gas separation) of the chemical solvents from which they are derived. For example, N,N-dialkylaminoalkanols can be derived from primary and secondary aminoalkanols (for example monoethanolamine, diethanolamine, and the like) by the addition of an alkylating agent to such chemical solvent. Alkylating agents include alkyl halides, alkenes (with ethylenic unsaturation such as vinyl, allyl, or the like; or with olefinic unsaturation), alkyl epoxides, alkyl carboxylates, alkyl sulfates, and a wide variety of other alkylating agents well known in the art. For present purposes the alkylating agents optionally can contain ether linkages (alkyl ethers) and such alkoxyalkyl alkylating agents are included herein. Similarly, diaklyl carbonates can be derived from alkali metal carbonate salts and di-alkali metal carbonate salts by similar reaction techniques. The reaction product of the alkylating agent and the chemical solvent is a physical solvent which retains a high selectivity of the chemical solvent from which the physical solvent was derived, and possesses the advantages which conventional physical solvents (e.g. methanol or the like) generally have.

A variety of alcohols and glycol ether cosolvents can be admixed with the physical solvents of this invention up to about 50% by weight of the physical solvent. Such cosolvents can aid in maintaining a practical viscosity of the solvent especially at lower temperatures of operation. Such cosolvents also are chemically unreactive with the acidic gas. Representative alcohol cosolvents include alkanols such as methanol, ethanol, and the like and mixtures thereof. Representative glycol ether cosolvents include monoaklylethers of glycols (for example 2-methoxyethanol, 2-ethoxyethanol, 3-methoxypropanol, and the like), dialkylethers of glycols (for example, dimethoxymethane, 1,2-dimethoxyethane, and the like), dicarboxylic acid esters of glycols (for example ethylene glycol diacetate and the like), and the like and mixtures thereof.

In practicing the present invention, the gaseous mixture is contacted with the solvent, the solvent regenerated (the acidic gas stripped from the solvent), and the regenerated solvent recycled for additional absorption of acidic gas. While the gaseous mixture/solvent contact can be a batch operation, efficiency and economy dictate that the contact be a continuous operation using, for example, countercurrent gas/liquid absorption columns. Contact or acidic gas removal conditions include temperatures of about −50° to 200° F., advantageously about 0° to 100° F.; and pressures of about 1 to 2000 psig, advantageously about 100 to 1000 psig. Absorption columns are conventional in construction and in materials of construction, and preferably are packed columns, plate columns (for example, bubble cap, sieve, or valve types), spray columns, and like conventional equipment.

Following such absorption step, the spent solvent (solvent plus absorbed acidic gas) is transported to a regeneration operation for regeneration of the solvent. Regeneration typically involves heating of the solvent usually under reduced pressure and/or inert gas sparging of the solvent, and various combinations and variations of these methods. Depending upon the boiling point of the physical solvent, regeneration temperatures of around 100° to about 350° F. and higher can be used optionally under reduced pressures of as low as about 1 psig. Regeneration of such spent solvent is a well known and common commercial process.

The regenerated solvent then is recycled to the absorption zone, optionally with fresh solvent when necessary, desirable or convenient, for additional absorption of acidic gas. The solvent circulation rate of such a cyclic process is the rate at which the solvent is cycled through the process per volume of gas treated. An advantage of the physical solvent of the present invention is that typically the solvent circulation rate is low compared to the circulation rate required of most chemical solvents. Usually, sulfur-containing acid gas can be treated for recovery of elemental sulfur and the CO$_2$ vented to the atmosphere, though other uses of the acidic gas may be practiced in conventional fashion.

The following examples show in detail how the invention can be practiced and should not be construed as limiting. In this application, all temperatures are in degrees Fahrenheit and all gas percentages are molar or volume percentages, unless otherwise expressly indicated.

EXAMPLES

Example 1

Three preferred N,N-dialkylaminoalkanols were tested in order to determine their selectivity for CO$_2$ absorption and their capacity for absorbing CO$_2$. These tests were conducted by contacting a CH$_4$-CO$_2$ gaseous mixture (50:50 by volume) with the various solvents at 32° F. and 350 psig in a batch equilibrium cell (300 ml) immersed in a constant-temperature bath. The following results were obtained.

TABLE 1

| SOLVENT | SE-LECT-IVITY | *$CO_2$ SOLUBILITY $\left(\dfrac{SCF\ CO_2}{GAL.\ SOLVENT}\right)$ |
|---|---|---|
| 2-Dimethylaminoethanol | 43.1 | 1.28 |
| 2-Diethylaminoethanl | 188 | 1.90 |
| Dimethylamino-2-propanol | 216 | 5.87 |

*Per atmosphere of $CO_2$ partial pressure

For comparison purposes, it should be noted that methanol (a conventional physical solvent) has a selectivity of only 6.5 and a $CO_2$ solubility of only 0.66 SCF $CO_2$/gallon of solvent. The exceptionally high selectivities of the physical solvents of the present invention clearly are demonstrated by the above-tabulated results.

Heretofore, conventional physical solvents did not possess as high of selectivities as chemical solvents possessed. The present physical solvents retain the high selectivities of conventional chemical solvents while possessing the desirable properties of physical solvents (e.g. low regeneration energy, and low solvent circulation rate).

Example 2

Several solvents were tested in order to confirm their physical absorption of $CO_2$ and their chemical unreactivity with $CO_2$. Some of the solvents also were combined with monoalkyl ethers of glycol as cosolvents. Each solvent was contacted with $CO_2$ and then subjected to conventional desorption (or regeneration) with heating and/or nitrogen sparging of the solvent. The solvent prior to $CO_2$ absorption, after $CO_2$ absorption, and after desorption was subjected to infrared spectroscopy testing and the resulting infrared spectra analyzed to determine whether any $CO_2$ had chemically reacted with the solvents and to confirm $CO_2$ desorption. The following table details the $CO_2$ absorption conditions and the results obtained.

TABLE 2

| SOLVENT | ABSORPTION CONDITIONS PSIC | °F. | P or C* | $CO_2$ DESORPTION** |
|---|---|---|---|---|
| 1-Dimethylamino-2-propanol | 200 | 77 | P | Yes |
| 2-Dimethylaminoethanol/2-Methoxyethanol (50:50 by weight) | 200 | −4 | P | Yes |
| 2-Diethylaminoethanol/2-Methoxyethanol (50:50 by weight) | 200 | −4 | P | Yes |
| 1-Dimethylamino-2-propanol/2-Methoxyethanol (50:50 by weight) | 200 | −4 | P | Yes |
| 1-Dimethylamino-2-propanol/2-Methoxyethanol (50:50 by weight) | 340 | 32 | P | Yes |
| 1-Dimethylamino-2-propanol/2-Ethoxyethanol (50:50 by weight) | 200 | −4 | P | Yes |

*P is for physical absorption and C is for chemical absorption in the solvent, as determined from comparative infrared analyses before and after $CO_2$ absorption.
**$CO_2$ desorption confirmed by infrared spectra following desorption.

Thus, the physical absorption of $CO_2$ and chemical unreactivity with $CO_2$ by the novel physical solvents is demonstrated.

Example 3

Several solvents were tested in order to determine the solubility of $CO_2$ in the solvents at various temperatures and to determine the heat of solution of $CO_2$ in the solvents. Monoalkyl ether of glycol cosolvents were added in equal weight proportions to the solvents in some of the tests. In each test pure $CO_2$ was contacted with the solvent at 200 psig at the temperatures indicated in the following table which displays the results obtained.

TABLE 3

| SOLVENT | $CO_2$ SOLUBILITY, LB. $CO_2$/LB. SOLVENT AT °F. | | | | | | HEAT OF SOLUTION (BTU/LB. $CO_2$) |
|---|---|---|---|---|---|---|---|
| | 149° | 100° | 77° | 68° | 32° | −4° | |
| 1-Dimethylamino-2-propanol | 0.082 | 0.099 | 0.132 | — | — | — | 167 |
| 2-Dimethylaminoethanol/2-Methoxyethanol | — | — | — | 0.205 | 0.292 | 0.404 | 104 |
| 2-Diethylaminoethanol/2-Methoxyethanol | — | — | — | 0.180 | 0.269 | 0.380 | 115 |
| 1-Dimethylamino-2-propanol/2-Methoxyethanol | — | — | — | 0.176 | 0.309 | 0.476 | 154 |
| 1-Dimethylamino-2-propanol/2-Methoxyethanol | — | — | — | — | 0.441* | — | — |
| 1-Dimethylamino-2-propanol/2-Ethoxyethanol | — | — | — | 0.152 | 0.247 | 0.415 | 154 |

*at 340 psig.

The above-tabulated results demonstrate the relatively low heats of solution which the present physical solvents have which is a decided benefit of the process. Also, the increasing solubility of $CO_2$ in the solvents at decreasing temperatures is demonstrated. The primary impediment to using very low temperatures is that the viscosity of the solvent may increase to a value which precludes practical commercial practice of the invention. In this connection, use of glycol ether cosolvents can assist in maintaining a useful viscosity of the solvent at lower absorption temperatures.

Example 4

A series of laboratory scale continuous absorption runs were conducted in a jacketed, continuous, countercurrent absorber (1.5 inch inside diameter) packed with Goodloe knitted mesh cartridges to a height of three feet. The feed gas containing acidic components analyzed to contain by volume: 32.81% $CO_2$, 10.20% $CH_4$, 0.027% $C_2H_6$, 46.54% $H_2$, and 10.42% CO. The absorption conditions are displayed in Table 4A below and the results obtained are displayed in Table 4B below. A comparative test with methanol solvent was run also.

TABLE 4A

| RUN NO. | SOLVENT | PSIG | SOLVENT °F. IN | SOLVENT °F. CUT | GAS °F. IN | GAS °F. CUT | SOLVENT GAL./HR. (GPH) | FEED GAS (SCFH) | SCFH FEED GAS GPH SOLVENT |
|---|---|---|---|---|---|---|---|---|---|
| Comparative | Methanol | 250 | −2 | −15 | 14 | 35 | 2.46 | 66.7 | 27.1 |
| 1 | 1-Dimethylamino-2-propanol | 300 | 36 | 33 | 54 | 56 | 1.99 | 41.2 | 20.7 |
| 2 | 1-Dimethylamino-2-propanol | 300 | 25 | 21 | 47 | 53 | 1.99 | — | — |
| 3 | 1-Dimethylamino-2-propanol | 295 | 23 | 19 | 46 | 52 | 1.56 | — | — |

TABLE 4B

| RUN NO. | SOLVENT | PURIFIED GAS SCFH | %$CO_2$ | %$CH_4$ | %$C_2H_6$ | %$H_2$ | %CO |
|---|---|---|---|---|---|---|---|
| Comparative | Methanol | 45.6 | 6.42 | 13.62 | 0.022 | 65.34 | 14.59 |
| 1 | 1-Dimethylamino-2-propanol | 29.7 | 5.69 | 13.45 | 0.027 | 66.24 | 14.61 |
| 2 | 1-Dimethylamino-2-propanol | 29.7 | 4.57 | 13.29 | — | 67.07* | 15.07 |
| 3 | 1-Dimethylamino-2-propanol | 29.7 | 5.79 | 12.94 | — | 67.12* | 14.15 |

| RUN NO. | SCFH PURIFIED GAS GPH SOLVENT | $CO_2$ REMOVAL (VOL-%) | $CH_4$ LOSS (VOL-%) | SELECTIVITY |
|---|---|---|---|---|
| Comparative | 18.5 | 86.7 | 8.7 | 68.07 |
| 1 | 14.9 | 87.5 | 5.0 | 133.00 |
| 2 | 14.9 | — | — | — |
| 3 | 19.0 | — | — | — |

*$H_2 + C_2H_6$

The above-tabulated results clearly demonstrate the excellent acidic gas removal which the present physical solvents provide in the process. Note that the $CO_2$ removal and solvent circulation rates (ratio of feed gas to solvent and ratio of purified gas to solvent) are comparable for the comparative methanol solvent run and run 1 using a preferred solvent of the invention. This comparability is unexpected since the absorption temperature for the comparative run was so much lower than the temperature of run 1. It is known that solubility of $CO_2$ increases with decreasing temperature. Thus, lowering the temperature for the preferred solvents will only improve their $CO_2$ absorption.

More remarkable, however, is the dramatic almost two-fold increase in selectivity of the 1-dimethylamino-2-propanol solvent over the selectivity of the methanol solvent. The solvent of run 1 has retained a high selectivity like that of the chemical solvent from which it was derived, while possessing advantageous properties which physical solvents generally possess.

The purified gas from the absorption zone typically goes to a methanation process for converting CO and unabsorbed $CO_2$ into methane. Usually, about 4–6% $CO_2$ is tolerable in the purified gas for its methanation in commercial practice of this process.

What is claimed is:

1. In a cyclic process for removing carbon dioxide containing acidic gas from a normally gaseous mixture containing same, wherein said gaseous mixture is contacted with a solvent under acidic gas/solvent contact conditions, said acidic gas bearing solvent is stripped of said acidic gas, and said stripped solvent is recycled for contact with additional gaseous mixture, the improvement which comprises:

contacting said gaseous mixture containing on a dry molar basis between about 5% and 95% carbon dioxide with a solvent which is liquid under said contact conditions, said solvent restricted to an anhydrous solvent which physically absorbs said acidic gas but which is chemically unreactive with said acidic gas under said contact conditions, said solvent selected from the group consisting of N,N-dialkylaminoalkanol, N,N-dialkoxyalkylaminoalkanol, N-alkyl-N-alkoxyalkylaminoalkanol, N,N-dialkylaminoalkylether, N,N-dialkoxyalkylaminoalkylether, N-alkyl-N-alkoxyalkylaminoalkylether, dialkyl carbonate, di(alkoxyalkyl) carbonate, mono-alkyl-monoalkoxyalkyl carbonate, and mixtures thereof, said solvent optionally in admixture with an anhydrous cosolvent which also is chemically unreactive with said acidic gas.

2. The process of claim 1 wherein said reaction product is selected from the group represented by the following general formulas and mixtures thereof,

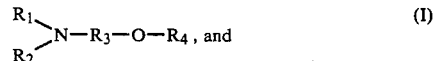 (I)

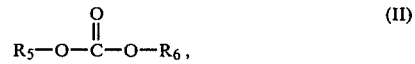 (II)

where
each $R_1$, $R_2$, $R_5$, and $R_6$, independently is a $C_1$–$C_8$ alkyl group or alkoxyalkyl group,
$R_3$ is a $C_1$–$C_6$ divalent alkyl group, and
$R_4$ is hydrogen or a $C_1$–$C_8$ alkyl group.

3. The process of claim 1 wherein said solvent is selected from the group consisting of 2-dimethylaminoethanol, 2-diethylaminoethanol, 2-diisopropylaminoethanol, 2-dibutylaminoethanol, 1-dimethylamino-2- propanol, 3-dimethylamino-1-propanol, 2-(N-methyl-N-ethylamino)ethanol, methyl 2-(dimethylamino)ethyl ether, ethyl 2-(diethylamino) ethyl ether, methyl 2-(diisopropylamino)ethyl ether, ethyl 2-(dibutylamino)ethyl ether, methyl (1-methyl-2-dimethylamino) ethyl ether, ethyl 3-dimethylamino-1-propyl ether, methyl 2-(N-methyl-N-ethylamino)ethyl ether, dimethyl carbonate, diethyl carbonate, dipropyl carbonate, bis-(2-ethoxyethyl) carbonate, bis-(2-methoxyethyl) carbonate, bis-(3-methylbutyl) carbonate, monoethyl-mono-2-butoxyethyl carbonate, and mixtures thereof.

4. The process of claim 1 wherein said gaseous mixture contains a dry molar basis between about 15% and 60% carbon dioxide.

5. The process of claim 1 wherein said contact conditions include a temperature of between about −50° and 200° F. and a pressure of between about 0 and about 2000 psig.

6. The process of claim 1 wherein said temperature ranges from about 0° to 100° F. and said pressure ranges about 100 to 1000 psig.

7. The process of claim 1 wherein said solvent is admixed with up to about 50% by weight of an alcohol or glycol ether cosolvent.

8. The process of claim 7 wherein said cosolvent is a monoalkylether of a glycol.

9. In a process for removing carbon dioxide containing acidic gas from a normally gaseous mixture containing same, wherein said gaseous mixture is contacted with a solvent at a temperature of between about −50° and 200° F. and a pressure of between about 1 and 2000 psig, the improvement which comprises:

contacting said gaseous mixture containing on a dry molar basis between about 15% and 95% carbon dioxide with a solvent which is liquid at said temperature and said pressure, said solvent restricted to an anhydrous solvent which physically absorbs said acidic gas but which is chemically unreactive with said acidic gas at said temperature and said pressure, said solvents selected from the group consisting of N,N-dialkylaminoalkanol, N,N-dialkoxyalkylaminoalkanol, N-alkyl-N-alkoxyalkylaminoalkanol, N,N-dialkylaminoalkylether, N,N-dialkoxyalkylaminoalkylether, N-alkyl-N-alkoxyalkylaminoalkylether, dialkyl carbonate, di(alkoxyalkyl) carbonate, mono-alkyl-monoalkoxyalkyl carbonate, and mixtures thereof, said solvent optionally in admixture with an anhydrous cosolvent which also is chemically unreactive with said acidic gas.

10. The process of claim 9 wherein said solvent is selected from the group consisting of 2-dimethylaminoethanol, 2-diethylaminoethanol, 2-diisopropylaminoethanol, 2-dibutylaminoethanol, 1-dimethylamino-2-propanol, 3-dimethylamino-1-propanol, 2-(N-methyl-N-ethylamino)ethanol, methyl 2-(dimethylamino)ethyl ether, ethyl 2-(diethylamino)ethyl ether, methyl 2-(diisopropylamino)ethyl ether, ethyl 2-(dibutylamino) ethyl ether, methyl (1-methyl-2-dimethylamino)ethyl ether, ethyl 3-dimethylamino-1-propyl ether, methyl 2-(N-methyl-N-ethylamino)ethyl ether, dimethyl carbonate, diethyl carbonate, dipropyl carbonate, bis-(2-ethoxyethyl) carbonate, bis-(2-methoxyethyl) carbonate, bis-(3-methylbutyl) carbonate, monoethyl-mono-2-butoxyethyl carbonate, and mixtures thereof.

* * * * *